United States Patent
Ogawa et al.

(10) Patent No.: US 10,859,987 B2
(45) Date of Patent: Dec. 8, 2020

(54) CONTROL PARAMETER COMPUTATION OF A PROPORTIONAL-INTEGRAL-DERIVATIVE (PID) CONTROLLER

(71) Applicant: TRANSTRON INC, Yokohama (JP)

(72) Inventors: Masatoshi Ogawa, Yokohama (JP); Takuma Degawa, Yokohama (JP)

(73) Assignee: TRANSTRON INC, Yokohama (JP)

( * ) Notice: Subject to any disclaimer, the term of this patent is extended or adjusted under 35 U.S.C. 154(b) by 0 days.

(21) Appl. No.: 16/414,647

(22) Filed: May 16, 2019

(65) Prior Publication Data

US 2019/0354072 A1 Nov. 21, 2019

(30) Foreign Application Priority Data

May 21, 2018 (JP) .................. 2018-097379

(51) Int. Cl.
*G05B 13/04* (2006.01)
*G05B 6/02* (2006.01)

(52) U.S. Cl.
CPC ............. *G05B 13/042* (2013.01); *G05B 6/02* (2013.01)

(58) Field of Classification Search
CPC .... G05B 17/02; G05B 13/042; G05B 13/048; G05B 13/04; G05B 13/024
See application file for complete search history.

(56) References Cited

U.S. PATENT DOCUMENTS

| 6,112,517 A * | 9/2000 | Yasui | ................. F02D 41/1403 123/674 |
| 6,278,899 B1 * | 8/2001 | Piche | .................. G05B 13/048 375/316 |

(Continued)

FOREIGN PATENT DOCUMENTS

| JP | 2009-537926 A | 10/2009 |
| JP | 2011-063130 A | 6/2011 |

(Continued)

OTHER PUBLICATIONS

Extended European Search Report of European Patent Application No. 19175099.1 dated Nov. 5, 2019.

(Continued)

*Primary Examiner* — Darrin D Dunn
(74) *Attorney, Agent, or Firm* — Maschoff Brennan

(57) ABSTRACT

A control parameter computation method includes, by a processor, identifying, for each time segment, a plurality of mathematical models of different structures. The method also includes, computing an adaptiveness representing a level of adaptation between a time series of the computed control variable predicted values and time series data of the control variable in the paired data corresponding to the time segments different from the time segment employed in the identification. The method also includes, selecting, as a mathematical model for the paired data of the time segment. The method also includes, configuring a PID controller, generating a transfer function represented by a product of the PID controller and the selected mathematical model, and generating a function representing a gain margin of the transfer function and a function representing a phase margin of the transfer function. The method also includes computing a parameter Lambda.

20 Claims, 16 Drawing Sheets

(56) References Cited

U.S. PATENT DOCUMENTS

| | | | |
|---|---|---|---|
| 8,200,346 B2* | 6/2012 | Thiele | G05B 17/02 700/44 |
| 10,534,325 B2* | 1/2020 | Dash | C02F 1/66 |
| 2006/0184477 A1* | 8/2006 | Hartman | G05B 13/048 706/21 |
| 2006/0224534 A1* | 10/2006 | Hartman | G05B 13/042 706/15 |
| 2007/0021850 A1 | 1/2007 | Wojszins et al. | |
| 2009/0198350 A1* | 8/2009 | Thiele | G05B 13/042 700/30 |
| 2010/0142662 A1* | 6/2010 | Santillo | B60R 16/03 375/345 |
| 2010/0204808 A1* | 8/2010 | Thiele | G05B 17/02 700/30 |
| 2012/0221124 A1* | 8/2012 | Thiele | G05B 13/042 700/31 |
| 2016/0026171 A1* | 1/2016 | Dash | G05B 17/02 700/267 |
| 2016/0121685 A1* | 5/2016 | Giovanardi | B60G 17/0165 701/38 |
| 2017/0138419 A1* | 5/2017 | Neuberth | F16D 48/06 |
| 2018/0017948 A1* | 1/2018 | Dash | G05B 13/024 |
| 2019/0090209 A1* | 3/2019 | Zoltan | H04B 7/15535 |

FOREIGN PATENT DOCUMENTS

| | | |
|---|---|---|
| JP | 2012-185658 A | 9/2012 |
| WO | 2007-136828 A2 | 11/2007 |

OTHER PUBLICATIONS

Byeong Soo Kim et al.,"Data modeling versus simulation modeling in the big data era: case study of a greenhouse control system" vol. 93, No. 7, Jun. 9, 2017 (Jun. 9, 2017), pp. 579-594, XP055635200.

Iori, H., et al., "Process Control Engineering," pp. 1-25 (Nov. 1, 2002).

Itoh, Y., et al., "UKF-based Estimation of Indicated Torque for IC engines Utilizing Nonlinear Two-inertia Model," 51st IEEE Conference on Decision and Control, pp. 4077-4082 (Dec. 10-13, 2012).

* cited by examiner

FIG.2

| IDENTIFICATION ID | 1 | 2 | 3 | ... | m |
|---|---|---|---|---|---|
| TIME | t1 | t2 | t3 | ... | tm |
| OPERATIONAL AMOUNT | u1 | u2 | u3 | ... | um |
| CONTROL VARIABLE | y1 | y2 | y3 | ... | ym |
| OPERATIONAL AMOUNT CHANGE QUANTITY | du1 | du2 | du3 | ... | dum |

FIG.4

| DATA ID | MODEL ID | MODEL PARAMETER ||||| 
|---|---|---|---|---|---|---|
| | | K | T | $T_1$ | $T_2$ | L |
| 1 | Model(1) | K(1) | T(1) | $T_1$(1) | $T_2$(1) | L(1) |
| 2 | Model(2) | K(1) | T(2) | $T_1$(2) | $T_2$(2) | L(2) |
| ... | ... | ... | ... | ... | ... | ... |
| num | Model(num) | K(num) | T(num) | $T_1$(num) | $T_2$(num) | L(num) |

FIG.5

| DATA ID | CONTROL PARAMETER | | | $\lambda$ |
|---|---|---|---|---|
| | Kp,opt | Ki,opt | Kd,opt | |
| 1 | Kp,opt(1) | Ki,opt(1) | Kd,opt(1) | $\lambda$,opt(1) |
| 2 | Kp,opt(2) | Ki,opt(2) | Kd,opt(2) | $\lambda$,opt(2) |
| ... | ... | ... | ... | ... |
| num | Kp,opt(num) | Ki,opt(num) | Kd,opt(num) | $\lambda$,opt(num) |

FIG.9

| DATA ID | ATTRIBUTE INFORMATION | | | CONTROL PARAMETER | | |
|---|---|---|---|---|---|---|
| | ATTRIBUTE 1 | ATTRIBUTE 2 | ATTRIBUTE 3 | $K_{p,opt}$ | $K_{i,opt}$ | $K_{d,opt}$ |
| 1 | c1(1) | c2(1) | c3(1) | Kp,opt(1) | Ki,opt(1) | Kd,opt(1) |
| 2 | c1(2) | c2(2) | c3(2) | Kp,opt(2) | Ki,opt(2) | Kd,opt(2) |
| ... | ... | ... | ... | ... | ... | ... |
| num | c1(num) | c2(num) | c3(num) | Kp,opt(num) | Ki,opt(num) | Kd,opt(num) |

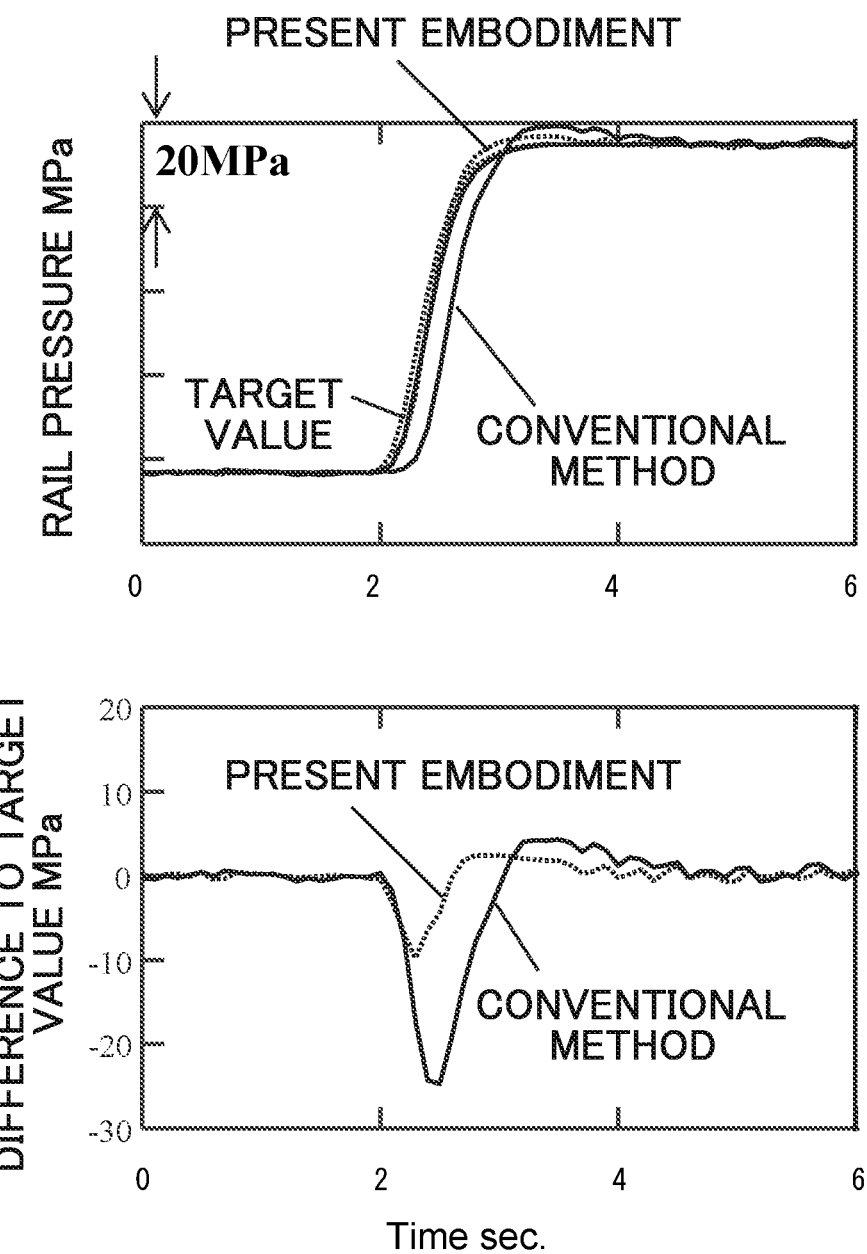

CONTROL PARAMETER COMPUTATION OF A PROPORTIONAL-INTEGRAL-DERIVATIVE (PID) CONTROLLER

CROSS-REFERENCE TO RELATED APPLICATION

This application is based upon and claims the benefit of priority of the prior Japanese Patent Application No. 2018-097379, filed on May 21, 2018, the entire contents of which are incorporated herein by reference.

FIELD

The embodiments discussed herein are related to a control parameter computation method, a control parameter computation program, a storage medium stored with a control parameter computation program, and a control parameter computation device.

BACKGROUND

Hitherto, various control methods are known. For example, active feedback control devices are known that not only reduce vibration in a frequency region subject to control, but also reduce vibration in a frequency region not subject to control.

There is also a known method for simultaneously selecting a filter and a loop proportional gain for a closed loop system. This method is employed in a frequency response function (FRF) representing a dynamic response to an operating force (such as motor torque) in a sensor used in feedback of speed control (for example, motor encoder angle). In such a tuning method, a combination of filter parameters is decided so as to enable a loop proportional gain ($K_p$) to be maximized while satisfying a set of criteria defined in relation to a stability margin.

A control parameter adaptation device is also known that is capable of raising the reliability of adaptive data. Such a device is equipped with a verification model that considers variation in dynamic characteristics, such as viscous friction, Coulomb friction, and the like, between products for mechanical configuration elements in power assisted steering systems. The verification model includes the most likely conditions to occur for a particular issue such as self-excited vibration of a steering wheel. In such a device, the verification model is populated with adaptive data that is control parameters that have been adapted, the operation of the power assisted steering system is simulated, and the validity of the adaptive data is verified based on the results of the simulation. This enables control parameters to be set that consider the variation in dynamic characteristics between products in mass production, and the reliability of the adaptive data is raised.

RELATED PATENT DOCUMENTS

Japanese Laid-Open Patent Publication No. 2012-185658
Japanese Laid-Open Patent Publication No. 2009-537926
Japanese Laid-Open Patent Publication No. 2011-63130

SUMMARY

According to an aspect of the embodiments, a control parameter computation method includes, by a processor, reading divided, paired data representing a pairing of time series data of an manipulated variable subject to control and time series data of a control variable with respect to the manipulated variable at each time for every predetermined time segment from a storage section storing the paired data for each time segment, and identifying, for each time segment, a plurality of mathematical models of different structures based on the paired data corresponding to the time segment, using a system identification method. The method also includes, for each time segment and the plurality of mathematical models identified for the time segment, using the mathematical models to compute predicted values of the control variable with respect to the manipulated variable in the paired data for the respective paired data corresponding to time segments different from the time segment employed in identification, and computing an adaptiveness representing a level of adaptation between a time series of the computed control variable predicted values and time series data of the control variable in the paired data corresponding to the time segments different from the time segment employed in the identification. The method also includes, for each time segment, selecting, as a mathematical model for the paired data of the time segment, a mathematical model for which the adaptiveness is greater than a predetermined threshold value. The method also includes, for each time segment, configuring a PID controller based on an internal model control method and on the respective selected mathematical model, generating a transfer function represented by a product of the PID controller and the selected mathematical model, and generating a function representing a gain margin of the transfer function and a function representing a phase margin of the transfer function. The method also includes computing a parameter Lambda in the internal model control method such that the function representing the gain margin is equal to or greater than a gain margin setting threshold value and the function representing the phase margin is equal to or greater than a phase margin setting threshold value, and so as to minimize a function represented by a sum of a difference between the function representing the gain margin and the gain margin setting threshold value added to a difference between the function representing the phase margin and the phase margin setting threshold value, and then computing a control parameter in the PID controller from the parameter Lambda.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an example of a data format for paired data at each time segment.

FIG. 4 is a diagram illustrating an example of a data format for model parameters of mathematical models.

FIG. 5 is a diagram illustrating an example of a data format for control parameters of a PID controller.

FIG. 9 is a diagram illustrating an example of a data format for attribute information and control parameters.

FIG. 16 is a diagram illustrating results of an Example of the present embodiment.

DESCRIPTION OF EMBODIMENTS

Detailed explanation follows regarding an example of an embodiment of technology disclosed herein, with reference to the drawings.

First Embodiment

Technology to estimate control parameters of PID control include, for example, step response based methods, Internal Model Control (IMC) methods, and the like.

In step response based methods, the dynamic behavior of a control variable with respect to an manipulated variable is acquired by experimentation. Moreover, in step response based methods the dynamic behavior acquired is expressed by a dynamic mathematical model such as a transfer function, equation of state, or the like. In step response based methods, the control parameters are then decided based on a steady-state gain, time constant, and dead time, which are all information related to the mathematical model.

Step response based methods focus on the time response of a control system, and are empirical rules derived through experimentation. This means that sometimes overshoot, undershoot, or the like occurs, with the issue arising that re-adjustment needs to be performed by actual tests.

However, in internal model control methods, a parameter Lambda is introduced as a parameter to adjust responsiveness. This means that ideal control performance can be realized in internal model control methods, without overshoot, undershoot, or the like occurring, as long as an appropriate mathematical model and parameter Lambda are employed.

However, there is some degree of freedom in the way in which the mathematical model, the parameter Lambda, and the like are decided. An issue accordingly arises in that in order to estimate the control parameters to realize control that does not suffer from overshoot or undershoot while securing stability in the control system, the mathematical model and parameter Lambda need to be decided by trial and error.

Thus in the present embodiment, control parameters are estimated so as to suppress overshoot or undershoot from occurring while securing stability, without performing trial and error on the mathematical model and the parameter Lambda. This enables a significant decreases in the workload needed for calibration in PID control. Specific explanation thereof follows.

Figure 1:
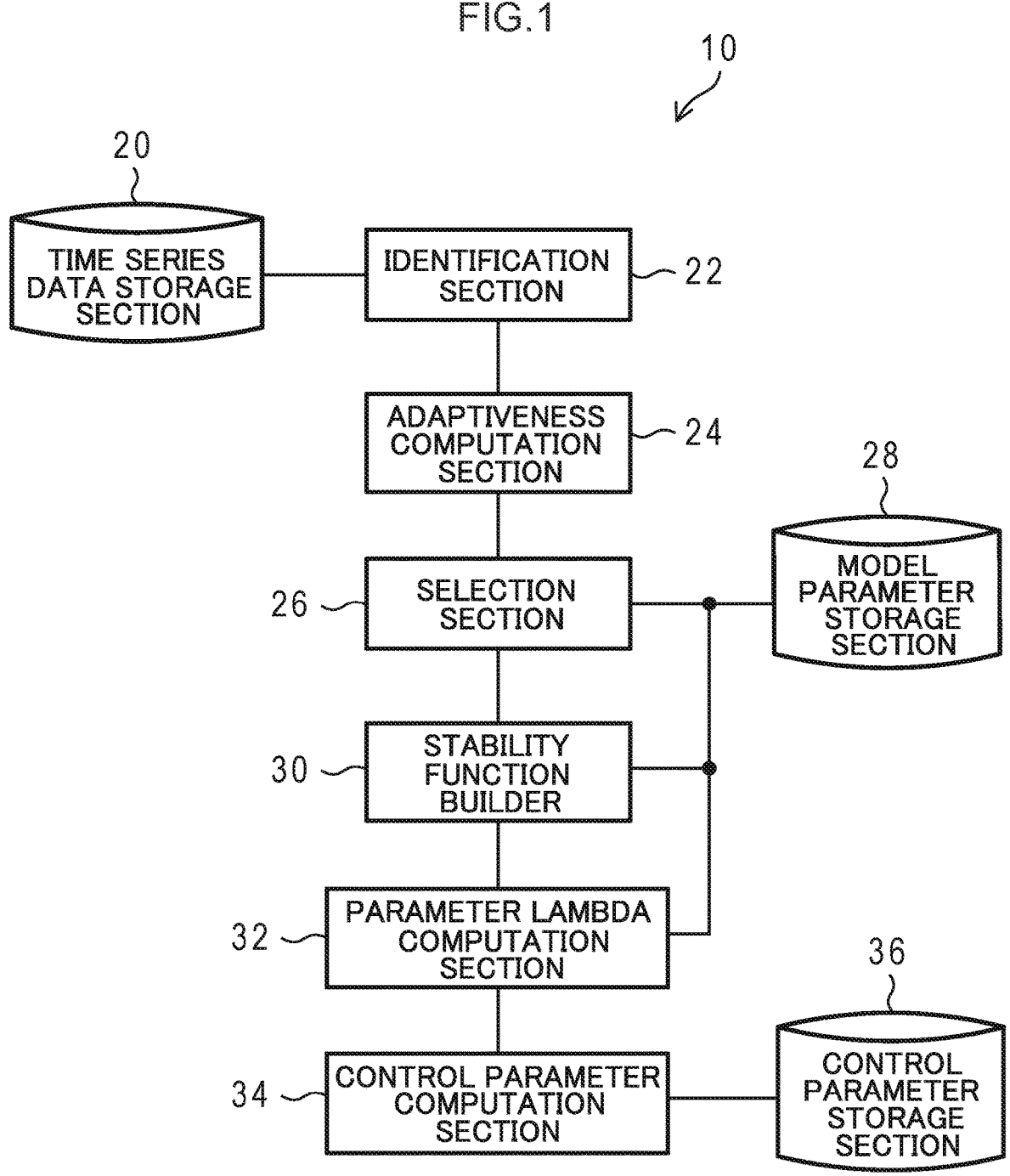
FIG. 1 is a schematic block diagram of a control parameter computation device according to a first embodiment.

As illustrated in FIG. 1, a control parameter computation device 10 according to an embodiment includes a time series data storage section 20, an identification section 22, an adaptiveness computation section 24, a selection section 26, a model parameter storage section 28, and a stability function builder 30. The control parameter computation device 10 also includes a parameter Lambda computation section 32, a control parameter computation section 34, and a control parameter storage section 36. The parameter Lambda computation section 32 is an example of a parameter computation section of the technology disclosed herein. The time series data storage section 20 is an example of a storage section of technology disclosed herein.

Paired data is stored in the time series data storage section 20 representing pairs of time series data of an manipulated variable subject to control and time series data of a control variable with respect to the manipulated variable at each time. The paired data is divided into predetermined time segments, and the paired data for each of the time segments is stored in the time series data storage section 20.

The paired data for each of the time segments is, for example, stored in the format of a table, as illustrated in FIG. 2. The paired data for each of the time segments is data for change in dynamic response of a control variable y when an manipulated variable u subject to control is changed dynamically, and is data acquired as pairs of time series data for the manipulated variable u and time series data for the control variable y. Information about a change width of steps in the manipulated variable when the manipulated variable u is dynamically changed stepwise (in steps) is also stored as an manipulated variable change quantity du.

An identification ID representing identification information of the paired data for each of the time segments, time series data for times t of the time segments, time series data of the manipulated variable, time series data of the control variable, and a scalar value of the manipulated variable change quantity for this time are stored associated with each other in the table illustrated in FIG. 2. For example, an identification ID 1 is stored in the example illustrated in FIG. 2, associated with a time series data t1 vector, an manipulated variable time series data u1 vector, a control variable time series data y1 vector, and an manipulated variable change quantity du1 scalar value for this time.

The identification section 22 first reads the paired data for each of the time segments stored in the time series data storage section 20. The identification section 22 then employs a system identification method to identify for each of the time segments plural mathematical models of different structures based on the paired data corresponding to these time segments.

Specifically, the identification section 22 identifies two or more mathematical models of different structures using a system identification method based on the paired data for one of the time segments. For example, the identification section 22 identifies mathematical models of different structures, such as a transfer function of a first order lag system+ dead time as represented by Equation (1) below, a transfer function of a second order lag system+dead time as represented by Equation (2) below, and the like. In Equation (1) and Equation (2), K represents gain, T, $T_1$, $T_2$ represent time constants, L represents a dead time, and s represents the Laplace operator. As well as transfer functions, the mathematical models may also employ state space models (equations of state), discrete event systems, and the like.

The system identification method may, for example, identify the model parameters such as the gain K, the time constants T, $T_1$, $T_2$, the dead time L, and the like using a prediction error method, a subspace identification method, or the like.

$$G_{p,1}(s) = \frac{K}{Ts+1} e^{-sL} \qquad \text{Equation (1)}$$

$$G_{p,2}(s) = \frac{K}{(T_1 s + 1)(T_2 s + 1)} e^{-sL} \qquad \text{Equation (2)}$$

Figure 3:
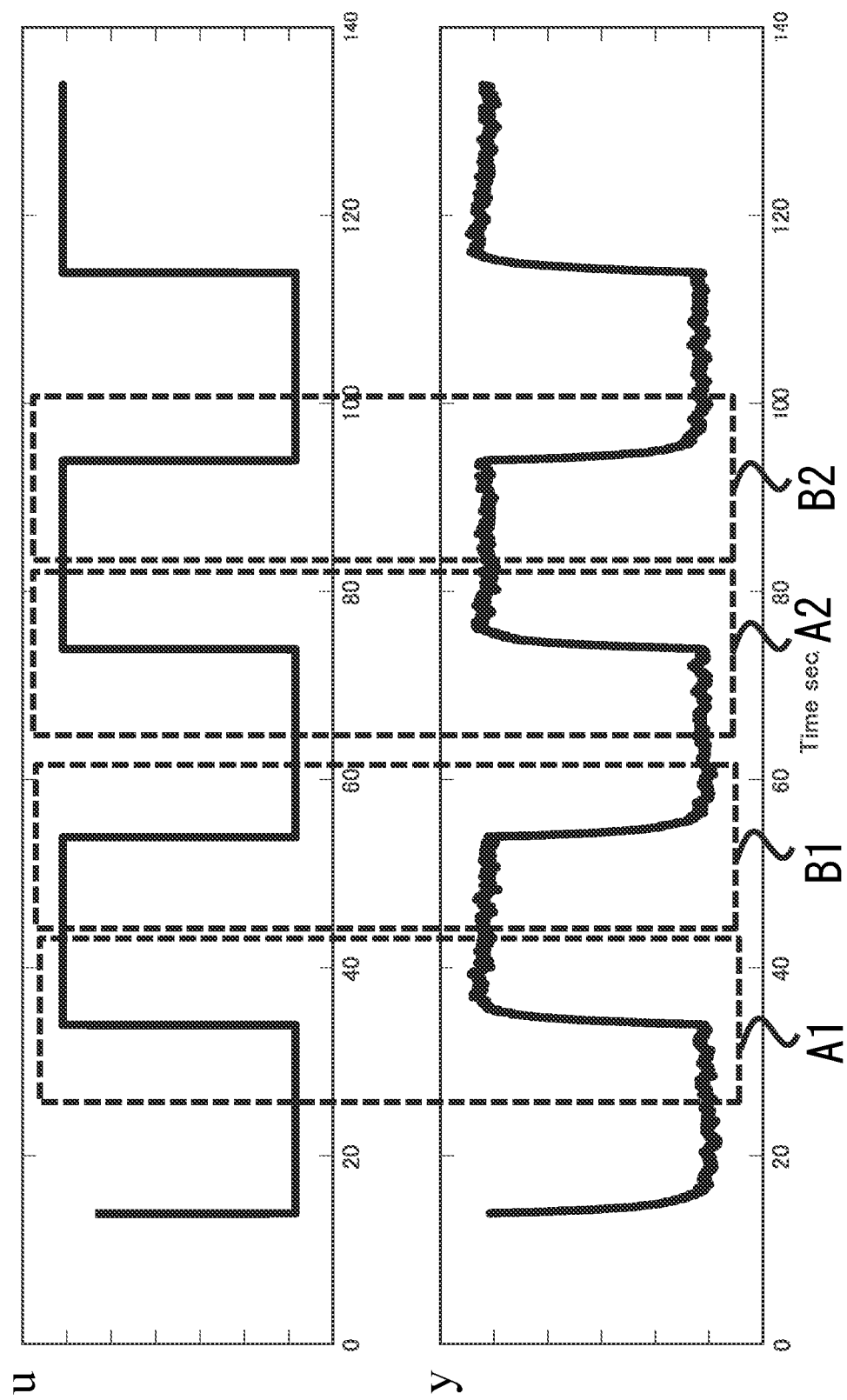
FIG. 3 is an explanatory diagram to explain an identification method of the present embodiment.

FIG. 3 is an explanatory diagram to explain an identification method of the present embodiment. As illustrated in FIG. 3, when time series data of the control variable y (bottom of FIG. 3) is obtained with respect to the time series data of the manipulated variable u (top of FIG. 3), the identification section 22 identifies plural mathematical models of different structures using paired data A1 corresponding to a first time segment. The identification section 22 also identifies plural mathematical models of different structures using paired data B1 corresponding to another time segment. The identification section 22 also identifies plural mathematical models of different structures using paired data A2 corresponding to another time segment. The identification section 22 also identifies plural mathematical models of different structures using paired data B2 corresponding to another time segment. In this manner the identification section 22 identifies for all of the time segments plural mathematical models of different structures based on paired data corresponding to each of the time segments.

Then for the respective plural mathematical models identified for each of the time segments by the identification section 22, the adaptiveness computation section 24 computes predicted values of the control variable with respect to the manipulated variables in the paired data by employing the respective paired data corresponding to time segments different to the time segment employed in identification. The adaptiveness computation section 24 then computes an adaptiveness representing the level of adaptation between the time series of the computed control variable predicted values, and the time series data of the control variable in the paired data corresponding to the time segments different to the time segment employed for identification.

More specifically, for each of the mathematical models $G_p$ (s) for each of the time segments, the adaptiveness computation section 24 employs the manipulated variable u in the paired data not employed in the identification to compute control variable predicted values ŷ according to Equation (3) below for time series using the mathematical models.

$$\hat{y} = G_p(s) u(s) \qquad \text{Equation (3)}$$

The adaptiveness computation section 24 then computes an adaptiveness $R^2$ according to Equation (4) below for the control variable predicted value time series data $\hat{y}_i$ with respect to the control variable y time series data $y_i$ of the paired data not employed for identification. The adaptiveness $R^2$ is a coefficient of determination or a multiple correlation coefficient.

$$R^2 = 1 - \frac{\sum_{i=1}^{n}(y_i - \hat{y}_i)^2}{\sum_{i=1}^{n}(y_i - \bar{y}_i)^2} \qquad \text{Equation (4)}$$

In Equation (4), i is an index of the time series data, and n indicates the total number of time segments. Note that a correlation coefficient, a Root Mean Square Error (RMSE), or the like may be employed for the adaptiveness.

The selection section 26 selects for each of the time segments a mathematical model for which the adaptiveness computed by the adaptiveness computation section 24 is greater than a predetermined threshold value for use as the mathematical model for the paired data of that time segment. The selection section 26 employs only a mathematical model having adaptiveness greater than the threshold value in order to eliminate mathematical models of low accuracy.

More specifically, the selection section 26 employs a mathematical model for which the adaptiveness computed by the adaptiveness computation section 24 is greater than the predetermined threshold value for single paired data of the manipulated variable u and the control variable y. The selection section 26 then stores information to identify the structure of the mathematical model employed for each of the time segments and model parameters thereof in the model parameter storage section 28.

The information to identify the mathematical model selected by the selection section 26 for each of the time segments and the model parameters of the mathematical model are stored in the model parameter storage section 28.

The model parameters of the mathematical model selected for each of the time segments are, for example, stored in the format of a table as illustrated in FIG. 4. Data IDs representing identification information of paired data for each of the time segments, model IDs representing identification information of the mathematical model selected for each of the time segments, and model parameters for the mathematical model are associated with each other and stored in the table illustrated in FIG. 4. For example, a data ID "1", a model ID "model (1)", and model parameters "K(1), T(1), $T_1(1)$, $T_2(1)$, and L(1)" are stored associated with each other in the example illustrated in FIG. 4.

The stability function builder 30 builds a stability function to compute the parameter Lambda in an internal control method. More specifically, the stability function builder 30 derives $K_p$ (λ), $T_i$, and $T_d$ using the internal model control method according to the mathematical model $G_p$ (s) for each of the time segments selected by the selection section 26 stored in the model parameter storage section 28. A list of computation equations for the $K_p$ (λ), $T_i$, and $T_d$ according to the mathematical model $G_p$ (s) are listed in Table 1 below.

TABLE 1

| Structure of mathematical model | $K_p(\lambda)$ | $T_i$ | $T_d$ |
|---|---|---|---|
| $\dfrac{K}{Ts+1}e^{-Ls}$ | $\dfrac{T}{(\lambda+L)K}$ | $T$ | ~ |
| $\dfrac{K}{Ts+1}e^{-Ls}$ | $\dfrac{T+L/2}{(\lambda+L/2)K}$ | $T+\dfrac{L}{2}$ | $\dfrac{TL}{2T+L}$ |
| $\dfrac{K}{(T_1s+1)(T_2s+1)}e^{-Ls}$ | $\dfrac{T_1+T_2}{(\lambda+L)K}$ | $T_1+T_2$ | $\dfrac{T_1T_2}{T_1+T_2}$ |
| $\dfrac{K(T_3s+1)}{(T_1s+1)(T_2s+1)}e^{-Ls}$ | $\dfrac{T_1+T_2-T_3}{(\lambda+L)K}$ | $T_1+T_2-T_3$ | $\dfrac{T_1T_2-(T_1+T_2+T_3)T_3}{T_1+T_2-T_3}$ |

Next, the stability function builder 30 builds a PID controller $G_c(s, \lambda)$ according to Equation (5) below based on the $K_p(\lambda)$, $T_i$, and $T_d$ computed according to the mathematical models $G_p(s)$ for each of the time segments.

$$G_c(s, \lambda) = K_p(\lambda)\left(1 + \frac{1}{T_i s} + T_d s\right) \qquad \text{Equation (5)}$$

Next, the stability function builder 30 generates the transfer function $L(s, \lambda)$ represented by a product of the respective mathematical models $G_p(s)$ selected for each of the time segments and the PID controller $G_c(s, \lambda)$ according to Equation (6) below.

$$L(s,\lambda) = G_p(s)G_c(s,\lambda) \qquad \text{Equation (6)}$$

The stability function builder 30 then employs the transfer function $L(s, \lambda)$ to build a function $g_m(\lambda)$ representing a gain margin of the transfer function $L(s, \lambda)$ and a function $p_m(\lambda)$ representing a phase margin of the transfer function $L(s, \lambda)$, as represented by Equations (7) below.

$$g_m(\lambda) = -20\log_{10}|L(jw_{pc},\lambda)|$$

$$p_m(\lambda) = 180 + \angle L(jw_{gc},\lambda) \qquad \text{Equation (7)}$$

In Equation (7), $w_{pc}$ is a frequency such that for the phase of transfer function $L(s, \lambda)$, $\angle L(jw) = -180$ [deg]. In Equation (7), $w_{gc}$ is a frequency such that the gain of transfer function $L(s, \lambda)$ is | | are symbols to indicate taking an absolute value of the content.

Based on the respective mathematical models stored in the model parameter storage section 28 and selected for each of the time segments, the parameter Lambda computation section 32 computes parameter Lambda $\lambda$, which is a parameter related to control parameters of a PID controller for each of these mathematical models. The parameter Lambda $\lambda$ is a parameter in the internal model control method.

More specifically, the parameter Lambda computation section 32 computes the parameter Lambda $\lambda$ of the internal model control method such that the function $g_m(\lambda)$ representing the gain margin is a setting threshold value $Gm_{th}$ for the gain margin or greater, and such that the function $p_m(\lambda)$ representing the phase margin is a setting threshold value $Pm_{th}$ for the phase margin or greater. The parameter Lambda computation section 32 also computes the parameter Lambda $\lambda$ according to Equation (8) so as to minimize a function expressed by a sum of a difference between the function $g_m(\lambda)$ representing the gain margin and the gain margin setting threshold value $Gm_{th}$ added to a difference between the function $p_m(\lambda)$ representing the phase margin and the phase margin setting threshold value $Pm_{th}$.

$$\lambda_{opt} = \operatorname*{argmin}_{\lambda}(|Gm_{th} - g_m(\lambda)| + |Pm_{th} - p_m(\lambda)|) \qquad \text{Equation (8)}$$

Note that optimization of the parameter Lambda $\lambda$ may be executed by employing an optimization algorithm such as a golden-section search method, a steepest descent method, Newton's method, an interior-point method, or a sequential quadratic programming method, or the like. In the present embodiment, the parameter Lambda $\lambda$ is increased gradually by predetermined increments from a value close to zero. This thereby enables a parameter Lambda $\lambda_{opt}$ to be found such that the function $g_m(\lambda)$ representing the gain margin is the gain margin setting threshold value $Gm_{th}$ or greater, and such that the function $p_m(\lambda)$ representing the phase margin is the phase margin setting threshold value $Pm_{th}$ or greater.

The control parameter computation section 34 computes control parameters in the PID controller based on the parameter Lambda $\lambda_{opt}$ computed by the parameter Lambda computation section 32.

More specifically, the control parameter computation section 34 employs the optimized parameter Lambda $\lambda_{opt}$ and according to Equations (9) below, computes a proportional gain $K_{p,\,opt}$, an integral gain $K_{i,\,opt}$, and a differential gain $K_{d,\,opt}$, which are the control parameters in each PID controller.

$$K_{p,opt} = K_p(\lambda_{opt})$$

$$K_{i,opt} = \frac{K_p(\lambda_{opt})}{T_i} \qquad \text{Equations (9)}$$

$$K_{d,opt} = K_p(\lambda_{opt})T_d$$

The control parameters in the PID controller computed by the control parameter computation section 34, which are the proportional gain $K_{p,\,opt}$, the integral gain $K_{i,\,opt}$, and the differential gain $K_{d,\,opt}$, are stored in the control parameter storage section 36.

The control parameters of the PID controller and the parameter Lambda are, for example, stored in the format of a table, as illustrated in FIG. 5. A data ID representing identification information of paired data and the control parameters are associated with each other and stored in the table illustrated in FIG. 5. For example, a data ID "1", and control parameters "$K_{p,\ opt}$ (1), $K_{i,\ opt}$ (1), $K_{d,\ opt}$ (1) and $\lambda_{d,\ opt}$ (1)" are associated with each other and stored in the example illustrated in FIG. 5.

The control parameters $K_{p,\ opt}$, $K_{i,\ opt}$, and $K_{d,\ opt}$ in the PID controller are employed to control a control system that obtained the data stored in the time series data storage section 20.

Figure 6:
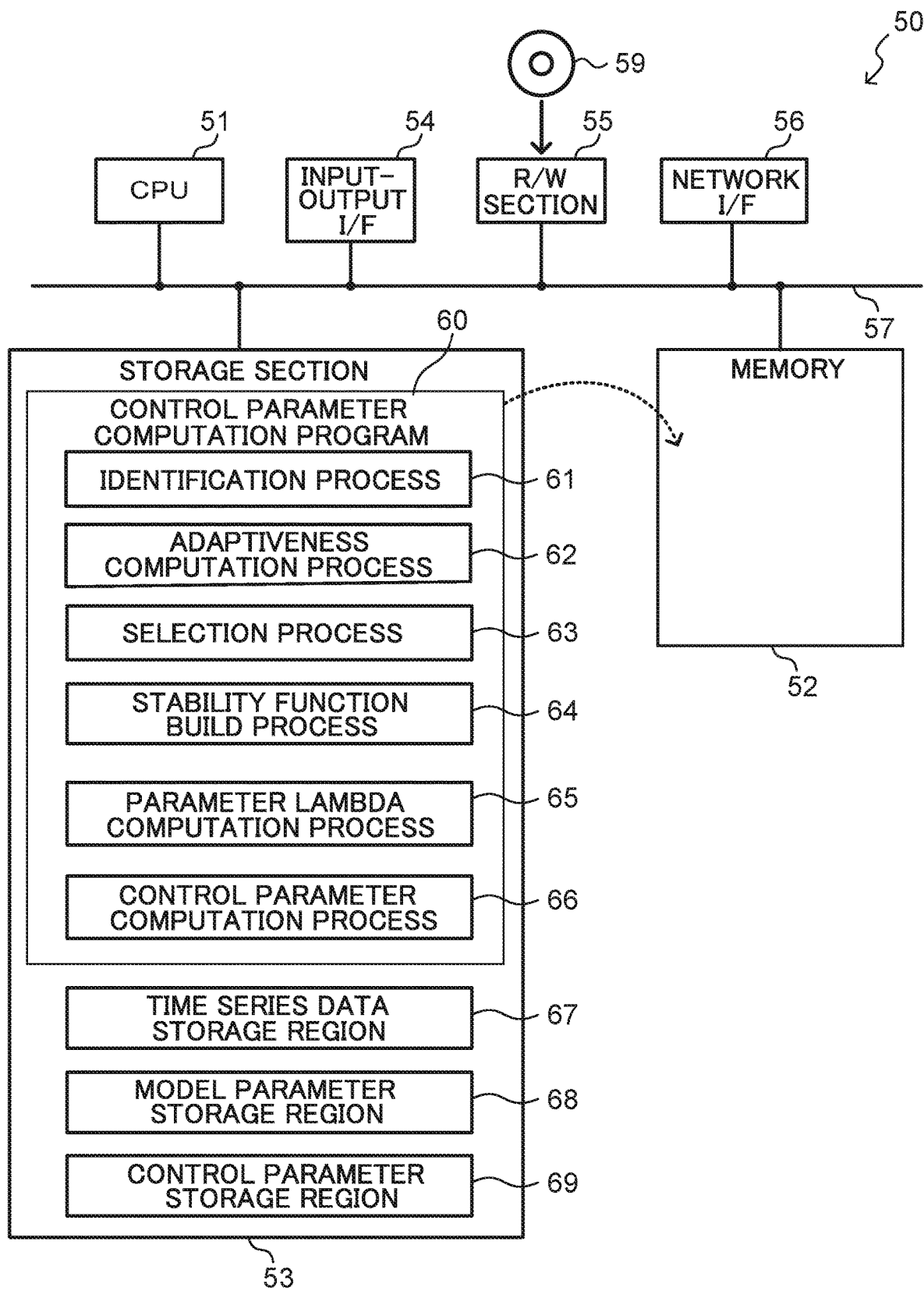
FIG. 6 is a block diagram illustrating a schematic configuration of a computer that functions as a control parameter computation device according to the first embodiment.

The control parameter computation device 10 may, for example, be implemented by a computer 50 illustrated in FIG. 6. The computer 50 includes a CPU 51, memory 52 serving as a temporary storage area, and a non-volatile storage section 53. The computer 50 includes an input-output interface (I/F) 54 connected to an input-output device, and a read/write (R/W) section 55 to control reading and writing of data to and from a recording medium 59. The computer 50 includes a network I/F 56 connected to a network such as the Internet. The CPU 51, the memory 52, the storage section 53, the input-output I/F 54, the R/W section 55, and the network I/F 56 are mutually connected together through a bus 57.

The storage section 53 may be realized by a hard disk drive (HDD), a solid state drive (SSD), a flash memory, or the like. A control parameter computation program 60 for causing the computer 50 to function as the control parameter computation device 10 is stored in the storage section 53 serving as a storage medium. The control parameter computation program 60 includes an identification process 61, an adaptiveness computation process 62, a selection process 63, a stability function build process 64, a parameter Lambda computation process 65, and a control parameter computation process 66. Information configuring the time series data storage section 20 is stored in a time series data storage region 67. Information configuring the model parameter storage section 28 is stored in a model parameter storage region 68. Information configuring the control parameter storage section 36 is stored in a control parameter storage region 69.

The CPU 51 reads the control parameter computation program 60 from the storage section 53 and expands the control parameter computation program 60 in the memory 52. The CPU 51 then sequentially executes the processes of the control parameter computation program 60. The CPU 51 operates as the identification section 22 illustrated in FIG. 1 by executing the identification process 61. The CPU 51 operates as the adaptiveness computation section 24 illustrated in FIG. 1 by executing the adaptiveness computation process 62. The CPU 51 operates as the selection section 26 illustrated in FIG. 1 by executing the selection process 63. The CPU 51 operates as the stability function builder 30 illustrated in FIG. 1 by executing the stability function build process 64. The CPU 51 operates as the parameter Lambda computation section 32 illustrated in FIG. 1 by executing the parameter Lambda computation process 65. The CPU 51 operates as the control parameter computation section 34 illustrated in FIG. 1 by executing the control parameter computation process 66. The CPU 51 reads information from the time series data storage region 67 and expands the time series data storage section 20 into the memory 52. The CPU 51 reads information from the model parameter storage region 68 and expands the model parameter storage section 28 into the memory 52. The CPU 51 reads information from the control parameter storage region 69 and expands the control parameter storage section 36 into the memory 52. The computer 50 executing the control parameter computation program 60 thereby functions as the control parameter computation device 10. The CPU 51 is hardware for executing the control parameter computation program 60, which is software.

However, the functions implemented by the control parameter computation program 60 may, for example, be implemented by a semiconductor integrated circuit, or more specifically by an application specific integrated circuit (ASIC) or the like.

Figure 7:
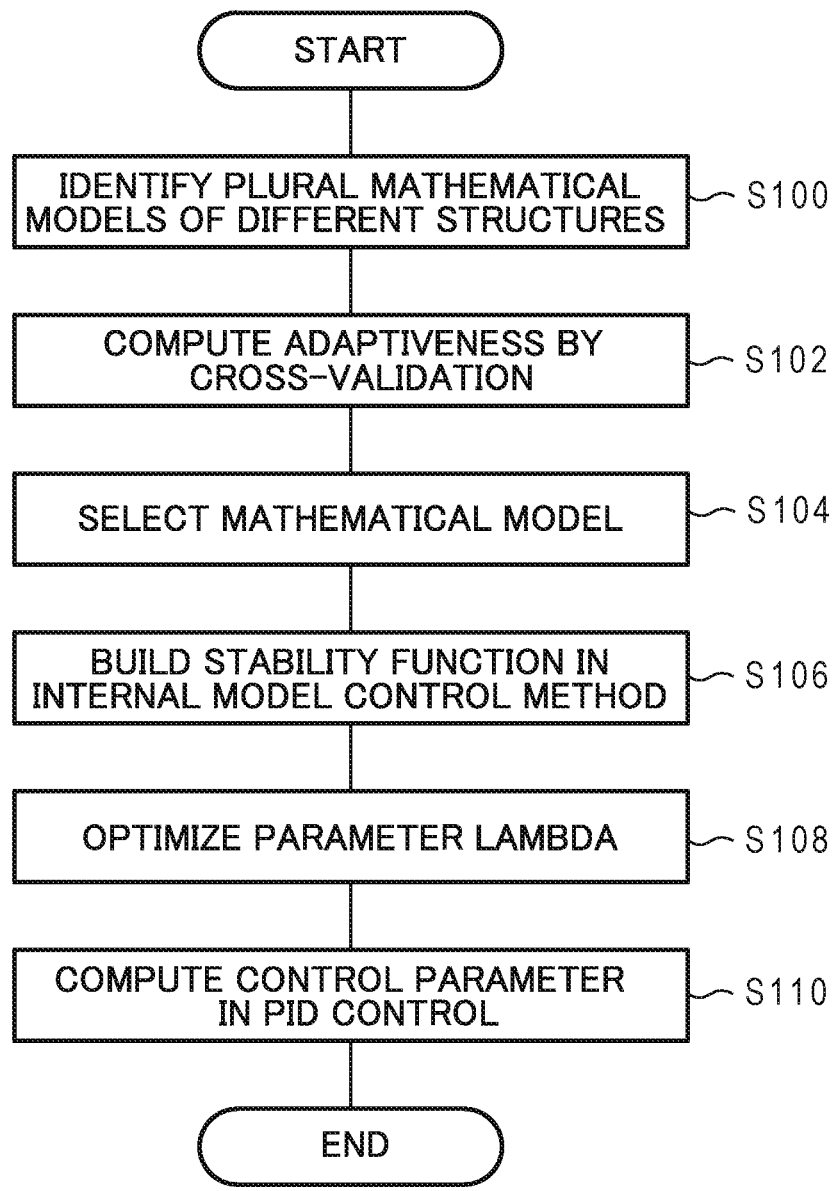
FIG. 7 is a flowchart illustrating an example of a control parameter computation processing routine of the present embodiment.

Explanation next follows regarding operation of the control parameter computation device 10 according to the present embodiment. On receipt of an instruction signal to compute control parameters, the control parameter computation device 10 executes a control parameter computation processing routine as illustrated in FIG. 7.

At step S100, the identification section 22 first reads paired data for each of the time segments stored in the time series data storage section 20. At step S100, the identification section 22 identifies for each of the time segments plural mathematical models of different structures using a system identification method based on the paired data corresponding to that time segment.

At step S102, for each of the plural mathematical models identified for each of the time segments at step S100, the adaptiveness computation section 24 computes, according to Equation (3), control variable predicted values time series data $\hat{y}_i$ using the manipulated variables u of the respective paired data not employed in the identification. Then at step S102, the adaptiveness computation section 24 computes, according to Equation (4), the adaptiveness $R^2$ for the control variable predicted values time series data $\hat{y}_i$ against the control variable y time series data $y_i$ of the paired data not employed in the identification.

At step S104, the selection section 26 selects for each of the time segments a mathematical model for which the adaptiveness computed at step S102 is greater than a predetermined threshold value as the mathematical model for the paired data of that time segment. Then at step S104, the selection section 26 stores the model parameters of the mathematical models for each of the time segments in the model parameter storage section 28.

At step S106, the stability function builder 30 derives $K_p$ ($\lambda$), $T_i$, and $T_d$ using the internal model control method according to the model parameters of the mathematical models $G_p$ (s) for each of the time segments stored in the model parameter storage section 28 at step S104.

Then at step S106, the stability function builder 30 builds the PID controller $G_c$ (s, $\lambda$) according to Equation (5) based on the $K_p$ ($\lambda$), $T_i$, and $T_d$ computed according to the mathematical models $G_p$ (s) for each of the time segments.

Moreover, at step S106, the stability function builder 30 generates, according to Equation (6), the transfer function L (s, $\lambda$) represented by the product of the respective mathematical model $G_p$ (s) selected for each of the time segments multiplied by the PID controller $G_c$ (s, $\lambda$).

Then at step S106, the stability function builder 30 builds the function $g_m$ ($\lambda$) representing the gain margin of the transfer function L (s, $\lambda$) and the function $p_m$ ($\lambda$) representing the phase margin of the transfer function L (s, $\lambda$) as indicated in Equations (7).

At step S108, the parameter Lambda computation section 32 computes the parameter Lambda $\lambda_{opt}$ according to Equation (8) by gradually increasing the parameter Lambda $\lambda$ in predetermined increments from a value close to zero.

At step S110, the control parameter computation section 34 employs the parameter Lambda $\lambda_{opt}$ computed at step S108 to compute the control parameters, which are the proportional gain $K_{p,\ opt}$, the integral gain $K_{i,\ opt}$, and the differential gain $K_{d,\ opt}$, according to Equation (9). The control parameter computation section 34 then stores the proportional gain $K_{p,\ opt}$, the integral gain $K_{i,\ opt}$, and the differential gain $K_{d,\ opt}$ in the control parameter storage section 36 and ends processing.

As explained above, the control parameter computation device according to the present embodiment identifies for each of the time segments plural mathematical models of different structures using a system identification method based on the paired data corresponding to all of the time segments. Moreover, for each of the time segments and for each of the plural mathematical models identified for the respective time segments, the control parameter computation device uses the mathematical model to compute control variable predicted values with respect to the manipulated variables of the paired data for respective paired data corresponding to the time segments not employed in the identification. The control parameter computation device then computes the adaptiveness between the time series of the control variable predicted values, and the time series data for the control variable in the paired data corresponding to the time segments different to the time segment employed in the identification. The control parameter computation device then selects for each of the time segments a mathematical model for which adaptiveness is greater than a predetermined threshold value as the mathematical model for the paired data of that time segment. The control parameter computation device then computes the parameter Lambda for the control parameters of the PID controller for the mathematical model based on the respective mathematical model selected for each of the time segments. The control parameter computation device then computes the control parameters in the PID controller based on the computed parameter Lambda. This accordingly enables the control parameters in the PID control to be efficiently estimated.

The control parameters for PID control can moreover be acquired without using trial and error when deciding on plural mathematical models of different structures. Moreover, by optimizing the parameter Lambda in the internal model control method in consideration of the gain margin and the phase margin, the control parameters for PID control can be acquired without using trial and error, and while securing stability of the control system. This accordingly enables the workload for calibration to be reduced.

Second Embodiment

Next, explanation follows regarding a second embodiment. The second embodiment differs from the first embodiment in the point that an interpolation map of control parameters for PID control is further produced. The same reference numerals are appended to portions configured similarly to the first embodiment and explanation thereof will be omitted.

Figure 8:
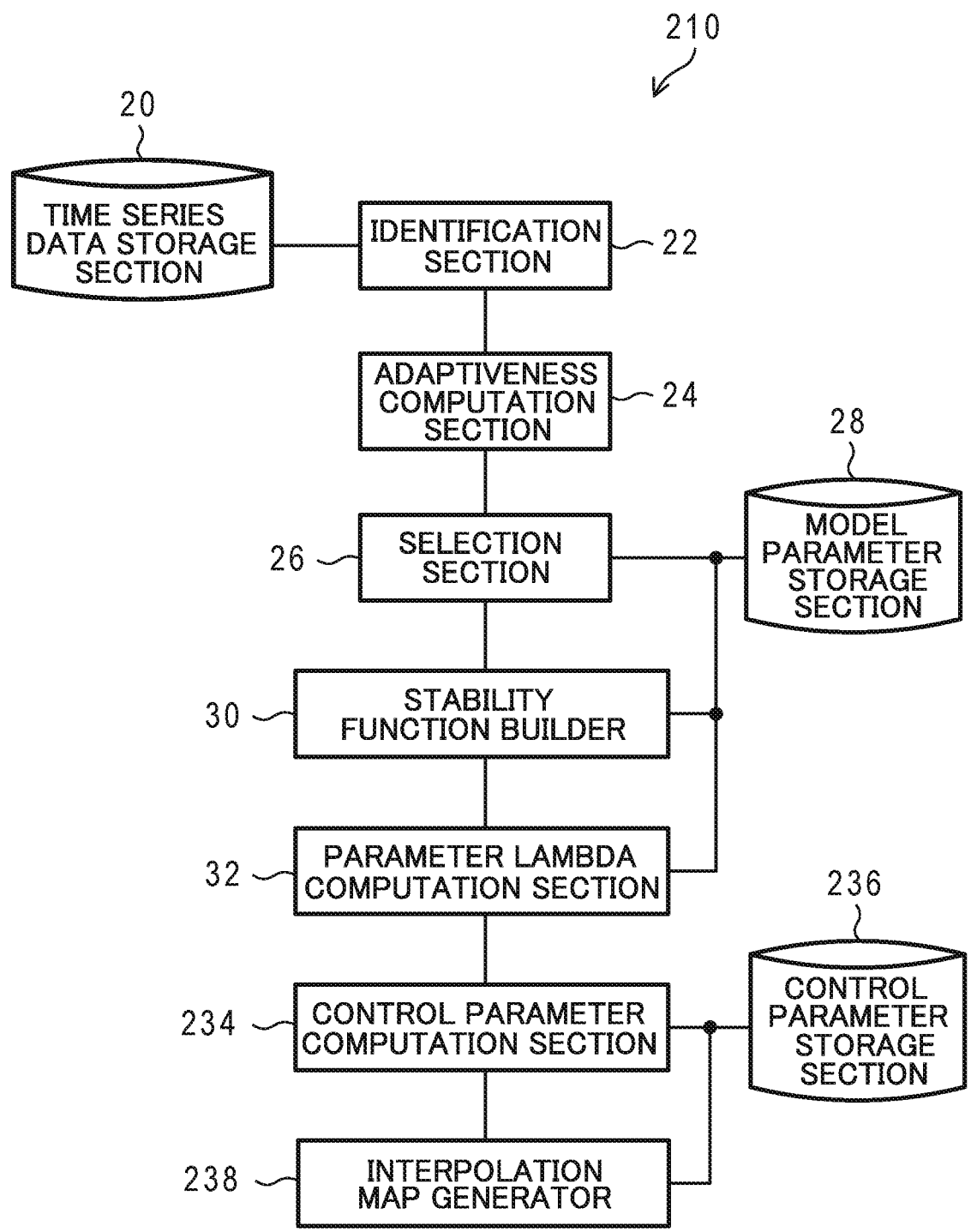
FIG. 8 is a schematic block diagram of a control parameter computation device according to a second embodiment.

As illustrated in FIG. 8, a control parameter computation device 210 according to the second embodiment includes a time series data storage section 20, an identification section 22, an adaptiveness computation section 24, a selection section 26, a model parameter storage section 28, and a stability function builder 30. The control parameter computation device 210 also includes a parameter Lambda computation section 32, a control parameter computation section 234, a control parameter storage section 236, and an interpolation map generator 238.

When computing the control parameters, the control parameter computation section 234 further acquires attribute information representing attributes when the control parameters are computed. The control parameter computation section 234 stores the attribute information and the control parameters in the control parameter storage section 236. Details regarding the attribute information are described below.

The attribute information and the control parameters are stored in the control parameter storage section 236. The attribute information and the control parameters are, for example, stored in the format of a table, as illustrated in FIG. 9. A data ID representing identification information for the paired data of each of the time segments, attribute information, and control parameters are associated with each other and stored in the table illustrated in FIG. 9. For example, a data ID "1", attribute information "c1(1), c2(1), and c3(1)", and the control parameters, which are proportional gain "$K_{p,\ opt}(1)$", integral gain "$K_{i,\ opt}(1)$", and differential gain "$K_{d,\ opt}(1)$", are associated with each other and stored in the example illustrated in FIG. 9.

Based on a combination of the attribute information and the control parameters stored in the control parameter storage section 236, the interpolation map generator 238 generates the interpolation map having attribute information and control parameters as axes, and interpolating a distribution of values of the attribute information and values of the control parameters.

Figure 10:
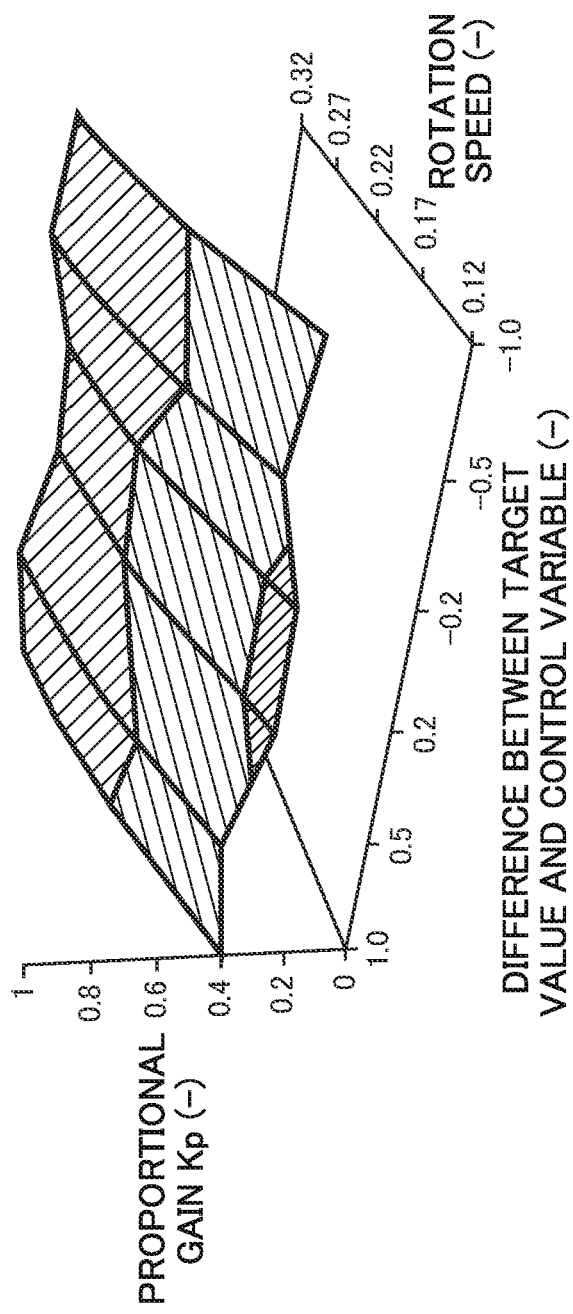
FIG. 10 is a diagram illustrating an example of an interpolation map.

FIG. 10 illustrates an example of the interpolation map. The example illustrated in FIG. 10 is an example in which the attribute information is "difference between target value and control variable" and "rotation speed" in the system to be controlled, and an example of the control parameters is the proportional gain $K_p$. In the example illustrated in FIG. 10, each of the apexes on the interpolation map correspond to values computed by the control parameter computation section 234. Moreover, each of the planes of the interpolation map correspond to values interpolated by the interpolation map generator 238.

Note that the attribute information may be any information as long as it is information obtainable when computing the control parameters. For example, by employing, as the attribute information, information about a change width of steps in the manipulated variable when the manipulated variable is dynamically changed stepwise (in steps), values of the control parameters can be referenced at higher precision.

Figure 11:
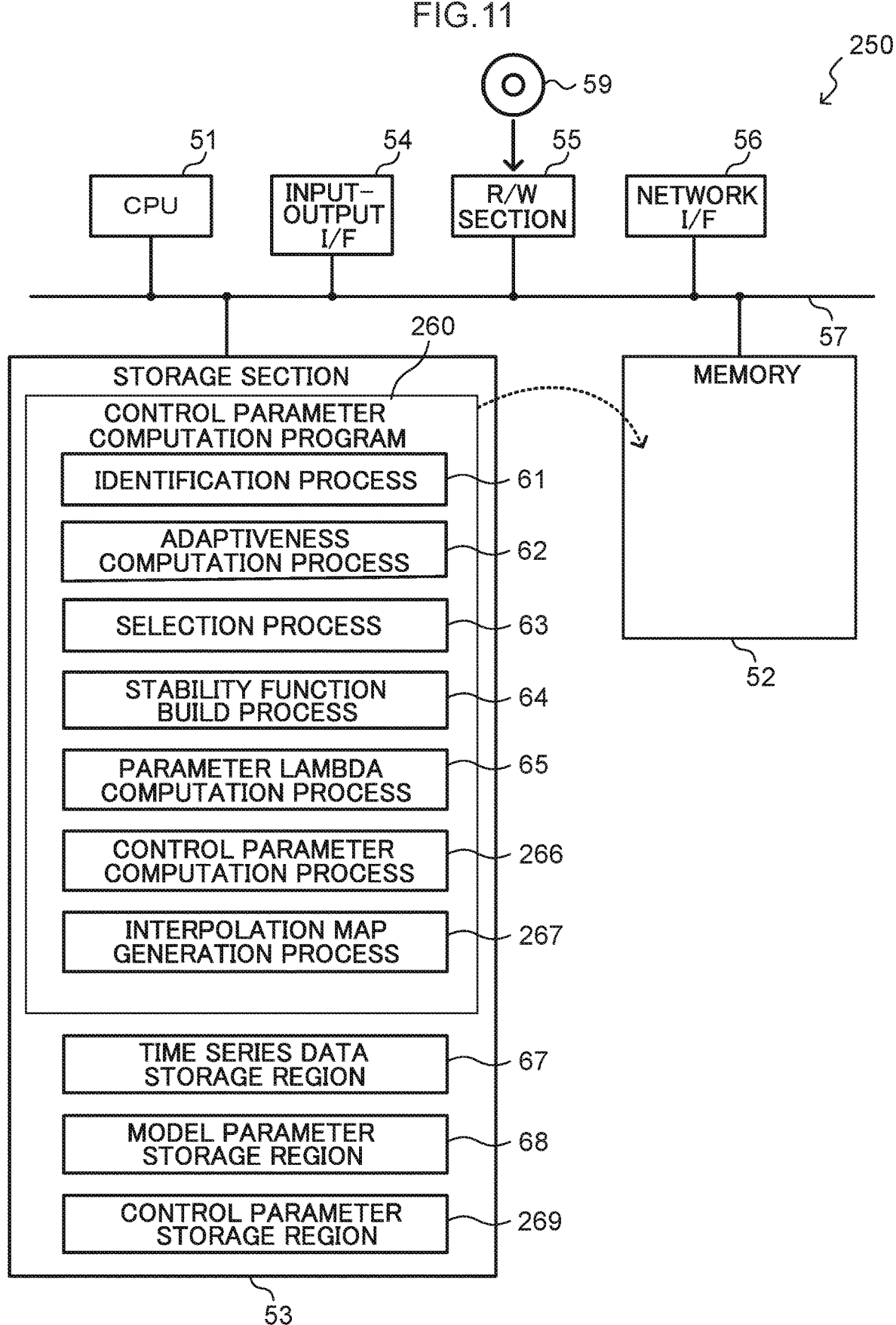
FIG. 11 is a block diagram illustrating a schematic configuration of a computer that functions as a control parameter computation device according to the second embodiment.

The control parameter computation device 210 may, for example, be realized by a computer 250 as illustrated in FIG. 11. A control parameter computation program 260 to cause the computer 250 to function as the control parameter computation device 210 is stored in a storage section 53 serving as a storage medium. The control parameter computation program 260 includes an identification process 61, an adaptiveness computation process 62, a selection process 63, a stability function build process 64, and a parameter Lambda computation process 65. The control parameter computation program 260 also includes a control parameter computation process 266 and an interpolation map generation process 267. Information configuring the time series data storage section 20 is stored in a time series data storage region 67. Information configuring the model parameter storage section 28 is stored in a model parameter storage region 68. Information configuring the control parameter storage section 236 is stored in a control parameter storage region 269.

A CPU 51 reads the control parameter computation program 260 from the storage section 53 and expands the control parameter computation program 260 in the memory 52. The CPU 51 then sequentially executes the processes of the control parameter computation program 260. The CPU 51 operates as the control parameter computation section 234 illustrated in FIG. 8 by executing the control parameter computation process 266. The CPU 51 operates as the interpolation map generator 238 illustrated in FIG. 8 by executing the interpolation map generation process 267. The CPU 51 reads information from the control parameter storage region 269 and expands the control parameter storage section 236 into the memory 52. Other processes are similar to those of the control parameter computation program 60 of the first embodiment. The computer 250 executing the control parameter computation program 260 thereby functions as the control parameter computation device 210.

Figure 12:
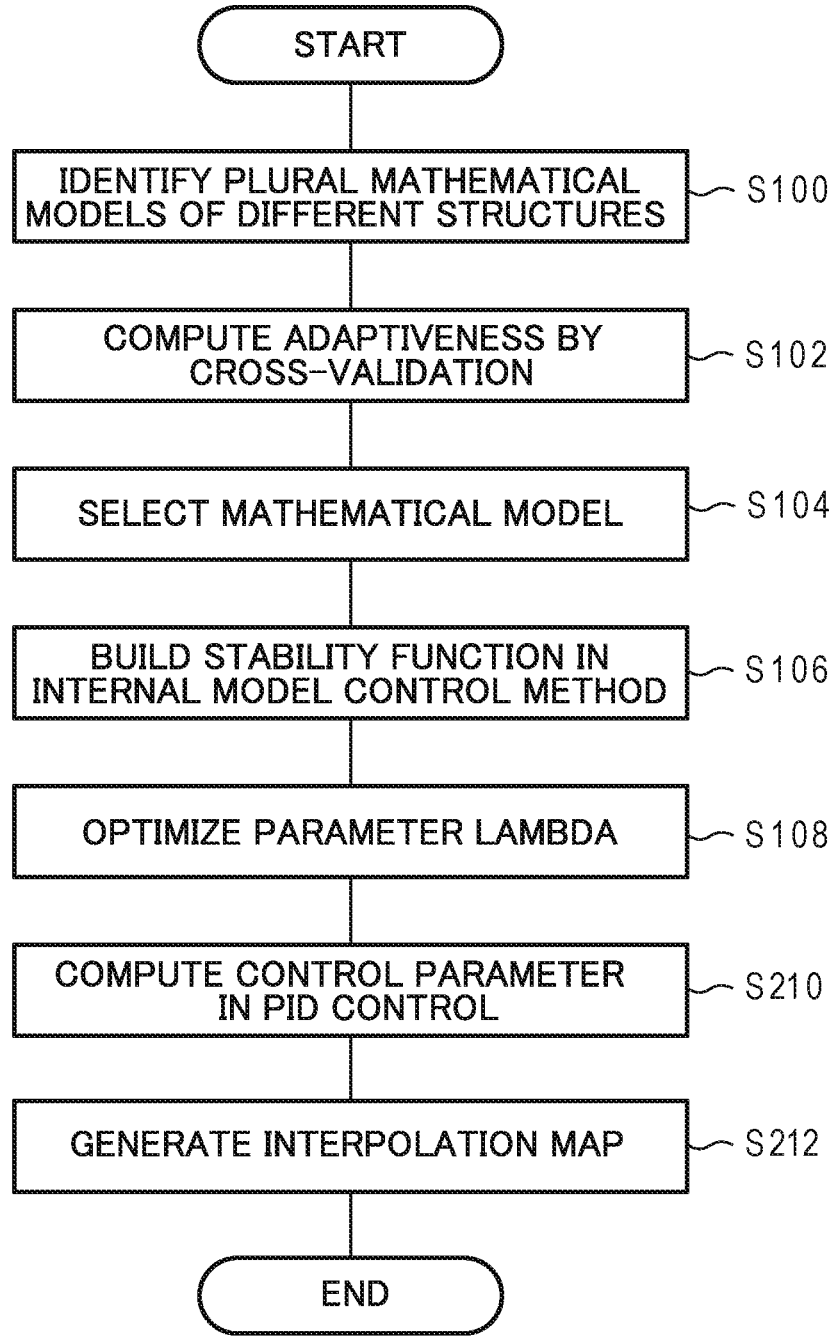
FIG. 12 is a flowchart illustrating an example of a control parameter computation processing routine of the second embodiment.

Next, explanation follows regarding operation of the control parameter computation device 210 according to the present embodiment. On receipt of an instruction signal to compute control parameters, the control parameter computation device 210 executes a control parameter computation processing routine illustrated in FIG. 12.

At step S210, when computing the control parameters the control parameter computation section 234 further acquires attribute information representing attributes when the control parameters are computed. The control parameter computation section 234 then stores the attribute information and the control parameters in the control parameter storage section 236.

Based on a combination of the attribute information and the control parameters stored in the control parameter storage section 236 at step S210, the interpolation map generator 238 generates at step S212 the interpolation map interpolating a distribution of values of the attribute information and values of the control parameters.

As explained above, based on a combination of the attribute information and the control parameters, the control parameter computation device according to the second embodiment generates the interpolation map having the attribute information and the control parameters as axes and interpolating a distribution between values of the attribute information and values of the control parameters. This thereby enables control parameters to be referenced that are different to the directly computed control parameters.

Third Embodiment

Next, explanation follows regarding a third embodiment. The third embodiment differs from the first and the second embodiments in the point that, in control simulation, the control parameters are computed by repeatedly correcting the control parameters in consideration of an amount of overshoot from a target value or an amount of undershoot from a target value. The same reference numerals are appended to portions of configuration similar to that of the first and the second embodiments and explanation thereof will be omitted.

Figure 13:
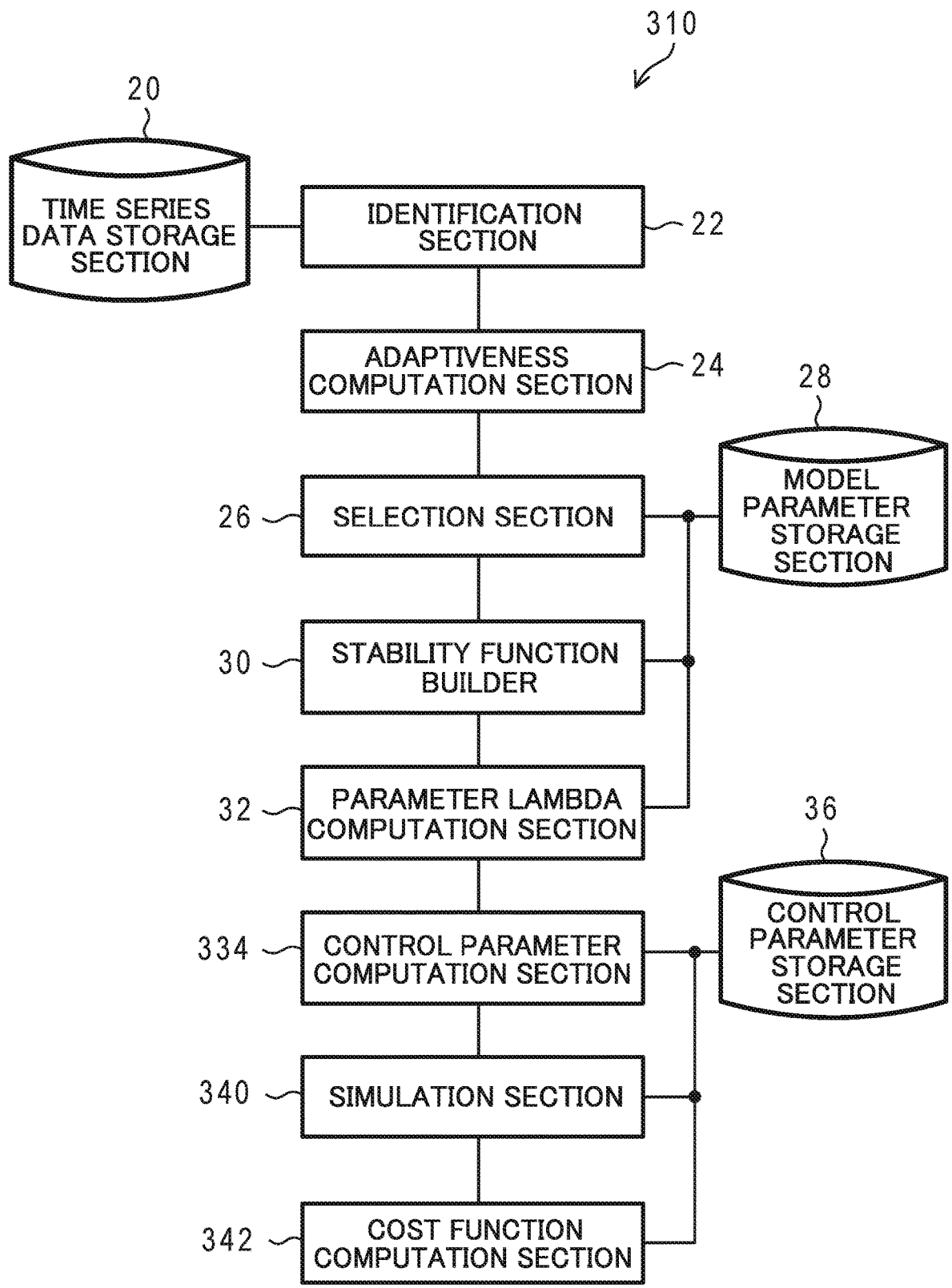
FIG. 13 is a schematic block diagram of a control parameter computation device according to a third embodiment.

As illustrated in FIG. 13, a control parameter computation device 310 according to the third embodiment includes a time series data storage section 20, an identification section 22, an adaptiveness computation section 24, a selection section 26, a model parameter storage section 28, and a stability function builder 30. The control parameter computation device 310 also includes a parameter Lambda computation section 32, a control parameter computation section 334, a control parameter storage section 36, a simulation section 340, and a cost function computation section 342.

The simulation section 340 sets a parameter Lambda stored in the control parameter storage section 36 as an initial value. The simulation section 340 then executes control simulation on a system in which a PID controller set with the initial value and a plant model represented by a mathematical model are connected in a closed loop system structure.

The cost function computation section 342 computes a predetermined cost evaluation based on the results of control simulation obtained by the simulation section 340.

A cost evaluation value J in the present embodiment includes an error evaluation value related to error between target value time series data and control variable time series data, a change evaluation value related to a change width in manipulated variable, and a penalty evaluation value related to an amount of overshoot from the target value or an amount of undershoot from the target value.

More specifically, the cost evaluation value J is represented by Equation (10) below.

$$J = Q_{err}\sum_{t=t_0}^{t_n}(y_{sim}-r_{trg})^2 + R\sum_{t=t_0}^{t_n}\Delta u^2(t) + Q_{over}\sum_{t=t_0}^{t_n}\Delta y_{sim,over}^2(t) \qquad \text{Equation (10)}$$

As indicated by Equation (10), the cost evaluation value J includes an error evaluation value related to error between time series of a target value $r_{trg}$ and of a control variable $y_{sim}$ in the control simulation results. The cost evaluation value J also includes a penalty evaluation value of an amount $\Delta y_{sim,\ over}$ of overshoot or undershoot from the target value in the control simulation results. The cost evaluation value J also includes a change evaluation value related to the width of change in the manipulated variable. The respective evaluation values are weighted by weighting coefficients $Q_{err}$, R, $Q_{over}$. In Equation (10), $t_n$ is an end time of the control simulation, and to is a start time of the control simulation. $\Delta u$ is a time change width of the manipulated variable.

The control parameter computation section 334 then computes the parameter Lambda by correcting the parameter Lambda until the gain margin setting threshold value $Gm_{th}$ and the phase margin setting threshold value $Pm_{th}$ are satisfied, and the width of reduction in cost evaluation value J is a predetermined threshold value or lower. The control parameter computation section 334 then computes the control parameters from the parameter Lambda.

Figure 14:
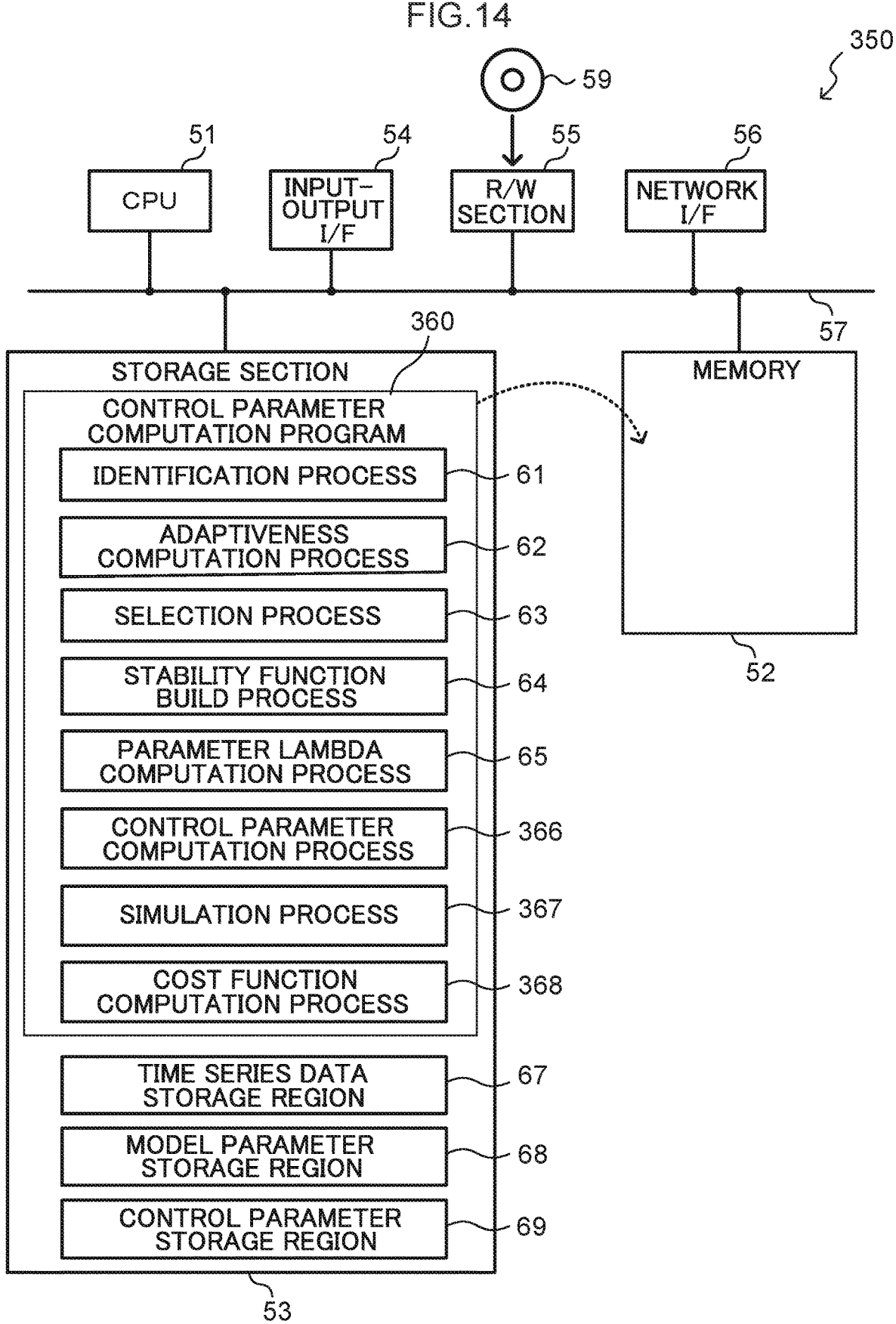
FIG. 14 is a block diagram illustrating a schematic configuration of a computer that functions as a control parameter computation device according to the third embodiment.

The control parameter computation device 310 may, for example, be realized by a computer 350 illustrated in FIG. 14. A control parameter computation program 360 to cause the computer 350 to function as the control parameter computation device 310 is stored in the storage section 53 serving as a storage medium. The control parameter computation program 360 includes an identification process 61, an adaptiveness computation process 62, a selection process 63, a stability function build process 64, and a parameter Lambda computation process 65. The control parameter computation program 360 also includes a control parameter computation process 366, a simulation process 367, and a cost function computation process 368. Information configuring the time series data storage section 20 is stored in a time series data storage region 67. Information configuring the model parameter storage section 28 is stored in a model parameter storage region 68. Information configuring the control parameter storage section 36 is stored in the control parameter storage region 69.

A CPU 51 reads the control parameter computation program 360 from the storage section 53 and expands the control parameter computation program 360 in the memory 52. The CPU 51 then sequentially executes the processes of the control parameter computation program 360. The CPU 51 operates as the control parameter computation section 334 illustrated in FIG. 13 by executing the control parameter computation process 366. The CPU 51 operates as the simulation section 340 illustrated in FIG. 13 by executing the simulation process 367. The CPU 51 operates as the cost function computation section 342 illustrated in FIG. 13 by executing the cost function computation process 368. The computer 350 executing the control parameter computation program 360 thereby functions as the control parameter computation device 310.

Figure 15:
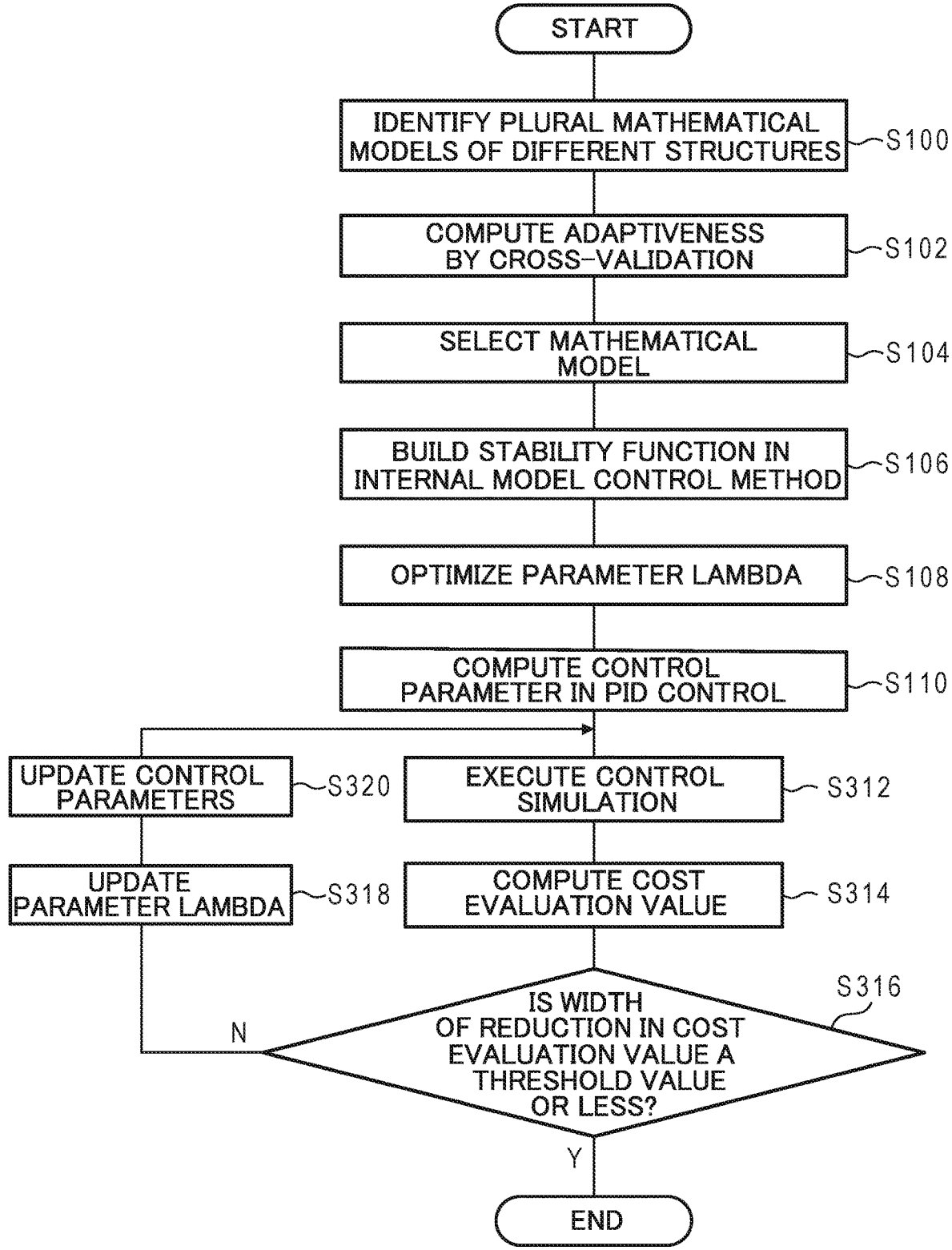
FIG. 15 is a flowchart illustrating an example of control parameter computation processing of the third embodiment.

Next, explanation follows regarding operation of the control parameter computation device 310 according to the present embodiment. On receipt of an instruction signal to compute control parameters, the control parameter computation device 310 executes a control parameter computation processing routine illustrated in FIG. 15.

At step S312, the simulation section 340 sets the control parameter computed at step S110 as an initial value when the repeated processing is being performed for the first time. The simulation section 340 then executes a control simulation on a system in which a PID controller set with the initial value and a plant model represented by a mathematical model are connected in a closed loop system structure. Moreover, the control simulation is executed based on the control parameter updated at step S320 when the repeated processing is not being performed for the first time.

At step S314, the cost function computation section 342 computes the cost evaluation value J according to Equation (10) based on the control simulation results obtained at step S312.

At step S316, the cost function computation section 342 determines whether or not a reduction in width between the cost evaluation value J computed at step S314 this time and the cost evaluation value J computed at step S314 the previous time is a threshold value or smaller. The processing is ended when the reduction in width between the cost evaluation value J computed at step S314 this time and the cost evaluation value J computed at step S314 the previous time is the threshold value or smaller. However, the processing transitions to step S318 when the reduction in width between the cost evaluation value J computed at step S314 this time and the cost evaluation value J computed at step S314 the previous time is larger than the threshold value.

At step S318, the parameter Lambda computation section 32 updates the parameter Lambda so that the value of the function $g_m(\lambda)$ representing the gain margin is the gain margin setting threshold value Gina, or greater, and so that the value of the function $p_m(\lambda)$ representing the phase margin is the phase margin setting threshold value $Pm_{th}$ or greater.

At step S320, the control parameter computation section 334 updates the control parameters based on the parameter Lambda updated at step S318.

As explained above, the control parameter computation device according to the third embodiment executes control simulation on a system in which the PID controller set with initial values for the control parameters and the plant model represented by the mathematical model are connected in a closed loop system structure. The control parameter computation device then computes the control parameters by repeatedly correcting the control parameters until the reduction in width of the cost evaluation value is the predetermined threshold value or less. This thereby enables control parameters to be acquired for implementing PID control in which overshoot or undershoot has been suppressed from occurring.

Example 1

Next, explanation follows regarding an Example of the control parameter computation device according to the present embodiment. The target for control in the present Example is an engine injection system for an automotive engine, and control results are compared for a control variable of a common rail pressure and an manipulated variable of a suction valve flow rate.

In conventional methods, a transfer function of a first order lag system is identified from time series data of an manipulated variable and a control variable, and control parameters for PID control are computed from information of steady-state gain, time constants, and dead time of the transfer function using a CHR method.

Results of a comparison between control results using control parameters in PID control in a control parameter computation device according to the present embodiment and in a conventional method are illustrated in FIG. 16. The line annotated with dots indicates the target value, the dotted line indicates results using the control parameter computation device according to the present embodiment, and the solid line indicates results using the conventional method.

The overshoot is smaller and the rise is also earlier in the control parameter computation device according to the present embodiment than in the conventional method, confirming that high control performance was achieved. In the conventional method, work is needed to adjust the control parameters using trial and error in order to achieve performance at the same level as that in the control parameter computation device according to the present embodiment, resulting in a significant increase in workload.

Note that although an embodiment has been explained in which each of the programs is stored in advance (pre-installed) in a storage section there is no limitation thereto. The programs according to the technology disclosed herein may be provided in a form recorded on a recording medium, such as a CD-ROM, DVD-ROM, USB memory, or the like.

All publications, patent applications and technical standards mentioned in the present specification are incorporated by reference in the present specification to the same extent as if each individual publication, patent application, or technical standard was specifically and individually indicated to be incorporated by reference.

Next, explanation follows regarding modified examples of the embodiments.

Although the control parameter computation devices in the above embodiments have been explained by way of examples in which the parameter Lambda in the internal control method is computed as an example of a parameter related to control parameters in PID control, there is no limitation thereto. For example, in place of the parameter Lambda in the internal control method, a predetermined coefficient may be computed as a parameter related to control parameters. For example, a predetermined coefficient $\alpha$ may be set as in the equations below, so as to compute the coefficient $\alpha$.

TABLE 2

| Structure of mathematical model | $K_p(\alpha)$ |
|---|---|
| $\dfrac{K}{Ts+1}e^{-Ls}$ | $\dfrac{T}{\alpha(T+L)K}$ |

The control parameter computation devices of the above embodiments are applicable to various applications. For example, examples of applications for the control parameter computation devices of the above embodiments include diesel engines subject to control, wherein the manipulated variable is an injection quantity of an injector, and the control variable is an input port temperature of a diesel particle filter.

When control parameters for Proportional-Integral-Differential (PID) control are derived, there is, for example, some degree of freedom in the method employed in an internal model control method to decide on a mathematical model and parameter Lambda. The mathematical model and parameter Lambda accordingly need to be decided by trial and error, with an issue arising regarding the workload for such work.

An aspect of the technology disclosed herein enables control parameters in PID control to be efficiently estimated.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A control parameter computation method comprising: by a processor:
   reading divided, paired data representing a pairing of time series data of a manipulated variable subject to control and time series data of a control variable with respect to the manipulated variable at each time for every predetermined time segment from a storage section storing the paired data for each time segment, and identifying, for each time segment, a plurality of mathematical models of different structures based on the paired data corresponding to the time segment, using a system identification method;
   for each time segment and the plurality of mathematical models identified for the time segment, using the mathematical models to compute predicted values of the control variable with respect to the manipulated variable in the paired data for the respective paired data corresponding to time segments different from the time segment employed in identification, and computing an adaptiveness representing a level of adaptation between a time series of the computed control variable predicted values and time series data of the control variable in the paired data corresponding to the time segments different from the time segment employed in the identification;
   for each time segment, selecting, as a mathematical model for the paired data of the time segment, a mathematical model for which the adaptiveness is greater than a predetermined threshold value;
   for each time segment, configuring a Proportional-Integral-Derivative (PID) controller based on an internal model control method and on the respective selected mathematical model, generating a transfer function represented by a product of the PID controller and the selected mathematical model, and generating a function representing a gain margin of the transfer function and a function representing a phase margin of the transfer function; and
   computing a parameter Lambda in the internal model control method such that the function representing the gain margin is equal to or greater than a gain margin setting threshold value and the function representing the phase margin is equal to or greater than a phase margin setting threshold value, and so as to minimize a function represented by a sum of a difference between the function representing the gain margin and the gain margin setting threshold value added to a difference between the function representing the phase margin and the phase margin setting threshold value, and then computing a control parameter in the PID controller from the parameter Lambda.

2. The control parameter computation method of claim 1, wherein
   based on a combination of attribute information representing an attribute when the control parameter is computed and based on the control parameter, an interpolation map is generated having the attribute information and the control parameter as axes and interpolating a distribution of values of the attribute information and values of the control parameter.

3. The control parameter computation method of claim 2, wherein
   the attribute information is a change width of the manipulated variable.

4. The control parameter computation method of claim 1, wherein:
   the parameter Lambda is set as an initial value, and a control simulation is executed on a system in which a PID controller set with the initial value and a plant model represented by the mathematical model are connected by a closed loop system structure; and
   the control parameter is computed by repeatedly correcting the parameter Lambda until a width of reduction in a cost evaluation value is a predetermined threshold value or less, the cost evaluation value including an error evaluation value related to an error between time series data of a target value and time series data of a control variable in results of control simulation and including a penalty evaluation value related to an amount of overshoot from the target value or an amount of undershoot from the target value in the control simulation results.

5. The control parameter computation method of claim 4, wherein
   the cost evaluation value further includes a change evaluation value related to a change width of the manipulated variable.

6. The control parameter computation method of claim 4, wherein
   each evaluation value included in the cost evaluation value is weighted by a pre-set value.

7. The control parameter computation method of claim 1, wherein
   when computing the parameter Lambda, the parameter Lambda is computed by repeatedly increasing the parameter Lambda until a value of the function representing the gain margin is equal to or greater than the gain margin setting threshold value, and a value of the function representing the phase margin is equal to or greater than the phase margin setting threshold value.

8. The control parameter computation method of claim 1, wherein the subject of control is a diesel engine, the manipulated variable is an injection quantity of an injector, and the control variable is an input port temperature of a diesel particle filter.

9. A non-transitory recording medium storing a control parameter computation program that is executable by a computer to perform a process, the process comprising:

reading divided, paired data representing a pairing of time series data of a manipulated variable subject to control and time series data of a control variable with respect to the manipulated variable at each time for every predetermined time segment from a storage section storing the paired data for each time segment, and identifying, for each time segment, a plurality of mathematical models of different structures based on the paired data corresponding to the time segment, using a system identification method;

for each time segment and the plurality of mathematical models identified for the time segment, using the mathematical models to compute predicted values of the control variable with respect to the manipulated variable in the paired data for the respective paired data corresponding to time segments different from the time segment employed in identification, and computing an adaptiveness representing a level of adaptation between a time series of the computed control variable predicted values and time series data of the control variable in the paired data corresponding to the time segments different from the time segment employed in the identification;

for each time segment, selecting, as a mathematical model for the paired data of the time segment, a mathematical model for which the adaptiveness is greater than a predetermined threshold value;

for each time segment, configuring a Proportional-Integral-Derivative (PID) controller based on an internal model control method and on the respective selected mathematical model, generating a transfer function represented by a product of the PID controller and the selected mathematical model, and generating a function representing a gain margin of the transfer function and a function representing a phase margin of the transfer function; and computing a parameter Lambda in the internal model control method such that the function representing the gain margin is equal to or greater than a gain margin setting threshold value and the function representing the phase margin is equal to or greater than a phase margin setting threshold value, and so as to minimize a function represented by a sum of a difference between the function representing the gain margin and the gain margin setting threshold value added to a difference between the function representing the phase margin and the phase margin setting threshold value, and then computing a control parameter in the PID controller from the parameter Lambda.

10. The non-transitory recording medium of claim 9, wherein, in the process:

based on a combination of attribute information representing an attribute when the control parameter is computed and based on the control parameter, an interpolation map is generated having the attribute information and the control parameter as axes and interpolating a distribution of values of the attribute information and values of the control parameter.

11. The non-transitory recording medium of claim 10, wherein, in the process:

the attribute information is a change width of the manipulated variable.

12. The non-transitory recording medium of claim 9, wherein, in the process:

the parameter Lambda is set as an initial value, and a control simulation is executed on a system in which a PID controller set with the initial value and a plant model represented by the mathematical model are connected by a closed loop system structure; and the control parameter is computed by repeatedly correcting the parameter Lambda until a width of reduction in a cost evaluation value is a predetermined threshold value or less, the cost evaluation value including an error evaluation value related to an error between time series data of a target value and time series data of a control variable in results of control simulation and including a penalty evaluation value related to an amount of overshoot from the target value or an amount of undershoot from the target value in the control simulation results.

13. The non-transitory recording medium of claim 12, wherein, in the process:

the cost evaluation value further includes a change evaluation value related to a change width of the manipulated variable.

14. The non-transitory recording medium of claim 12, wherein, in the process:

each evaluation value included in the cost evaluation value is weighted by a pre-set value.

15. A control parameter computation device comprising:
a memory; and
a processor coupled to the memory, the processor being configured to:

read divided, paired data representing a pairing of time series data of a manipulated variable subject to control and time series data of a control variable with respect to the manipulated variable at each time for every predetermined time segment from a storage section storing the paired data for each time segment, and identify, for each time segment, a plurality of mathematical models of different structures based on the paired data corresponding to the time segment, using a system identification method;

for each time segment and the plurality of mathematical models identified for the time segments, use the mathematical models to compute predicted values of the control variable with respect to the manipulated variable in the paired data for the respective paired data corresponding to time segments different from the time segment employed in identification, and compute an adaptiveness between a time series of the computed control variable predicted values and time series data of the control variable in the paired data corresponding to the time segments different from the time segment employed in the identification;

for each time segment, select, as a mathematical model for the paired data of the time segment, a mathematical model for which the adaptiveness is greater than a predetermined threshold value;

for each time segment, configure a Proportional-Integral-Derivative (PID) controller based on an internal model control method and on the respective selected mathematical model, generate a transfer function represented by a product of the PID controller and the selected mathematical model, and generate a function representing a gain margin of the transfer function and a function representing a phase margin of the transfer function;

compute a parameter Lambda in the internal model control method such that the function representing the gain margin is equal to or greater than a gain margin setting threshold value and the function representing the phase margin is equal to or greater than a phase margin setting threshold value, and so as to minimize a function represented by a sum of a difference between the function representing the gain margin and the gain margin setting threshold value added to a difference between the function representing the phase margin and the phase margin setting threshold value; and compute a control parameter in the PID controller based on the computed parameter Lambda.

16. The control parameter computation device of claim 15, wherein based on a combination of attribute information representing an attribute when the control parameter is computed and based on the control parameter, an interpolation map is further generated having the attribute information and the control parameter as axes and interpolating a distribution of values of the attribute information and values of the control parameter.

17. The control parameter computation device of claim 16, wherein the attribute information is a change width of the manipulated variable.

18. The control parameter computation device of claim 15, wherein:

the parameter Lambda is set as an initial value, and a control simulation is executed on a system in which a PID controller set with the initial value and a plant model represented by the mathematical model are connected by a closed loop system structure; and the control parameter is computed by repeatedly correcting the parameter Lambda until a width of reduction in a cost evaluation value is a predetermined threshold value or less, the cost evaluation value including an error evaluation value related to an error between time series data of a target value and time series data of a control variable in results of control simulation and including a penalty evaluation value related to an amount of overshoot from the target value or an amount of undershoot from the target value in the control simulation results.

19. The control parameter computation device of claim 18, wherein the cost evaluation value further includes a change evaluation value related to a change width of the manipulated variable.

20. The control parameter computation device of claim 18, wherein each evaluation value included in the cost evaluation value is weighted by a pre-set value.

* * * * *